Figure 3:
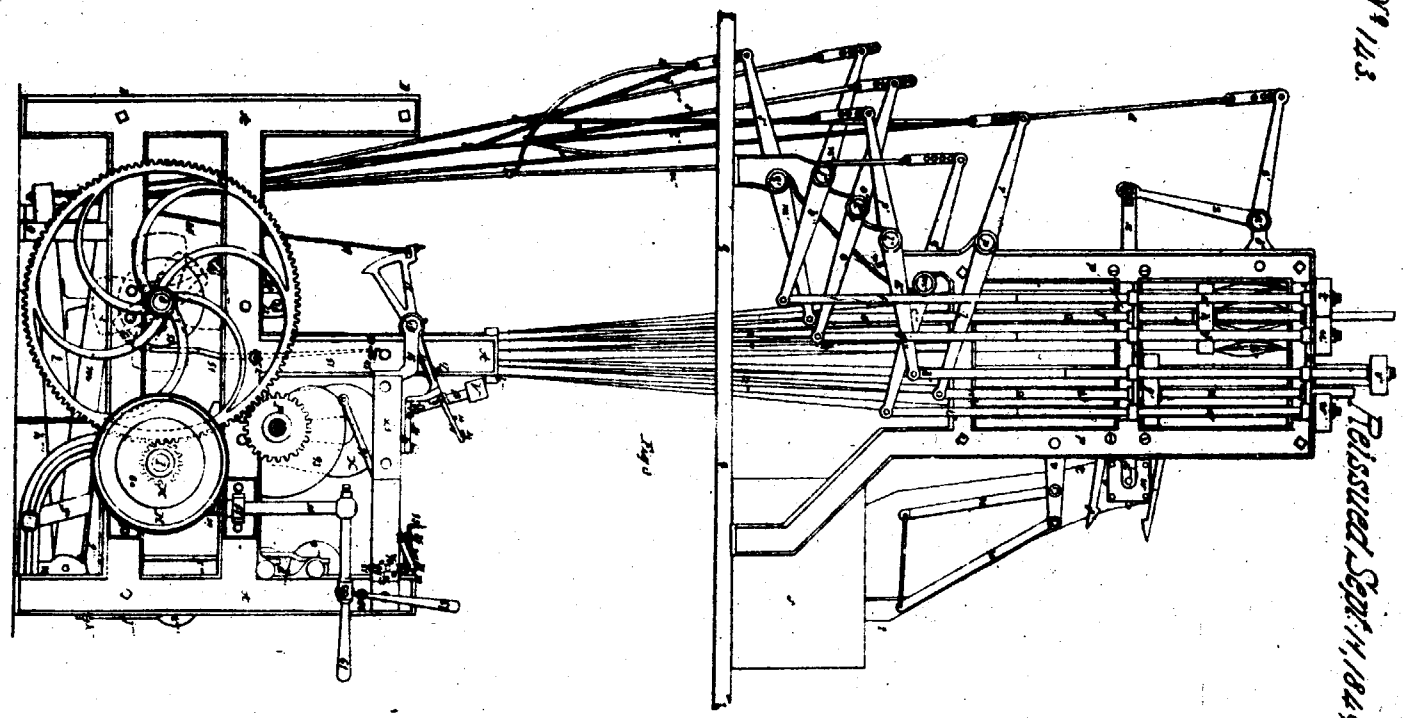

E. B. Bigelow
Sheet 1, 4 Sheets.
Carpet Loom.
No 143.
Reissued Sept 11, 1849.
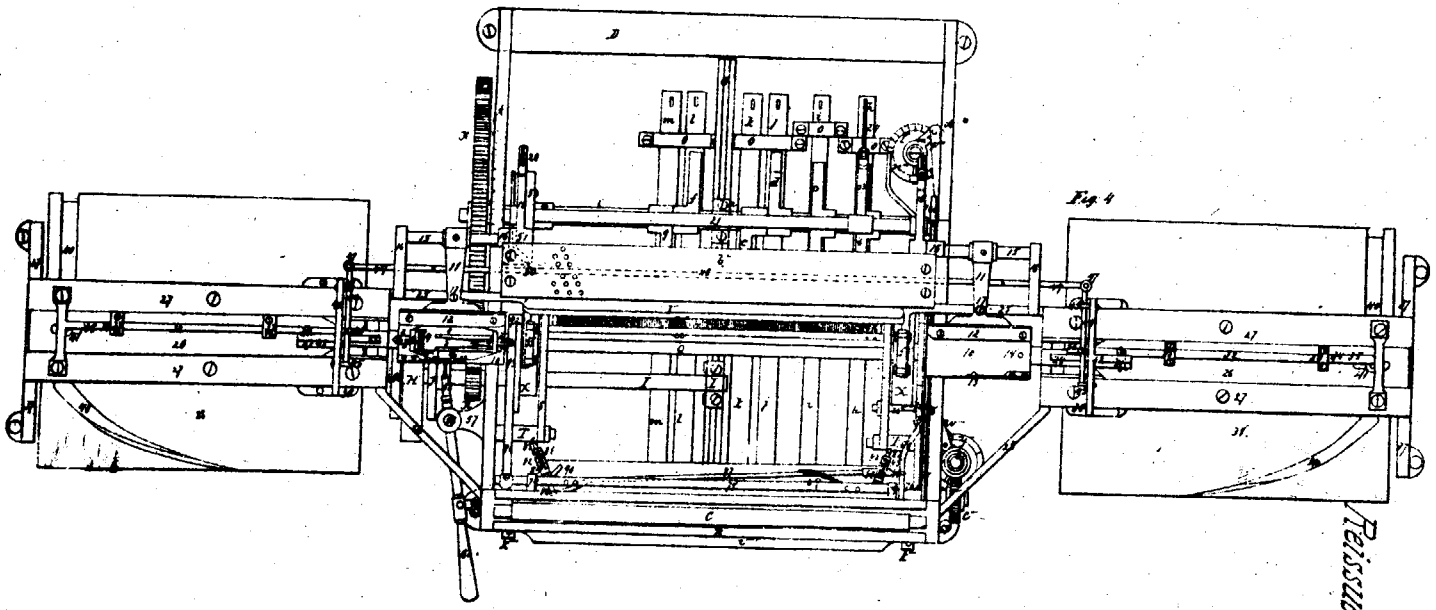

E.B. Bigelow

Sheet 2, 4 Sheets

Carpet Loom

No 143.

Reissued Sept. 11, 1849.

E. B. Bigelow.
Sheet 3, 4 Sheets.
Carpet Loom.
No. 143.
Reissued Sept 11, 1849.
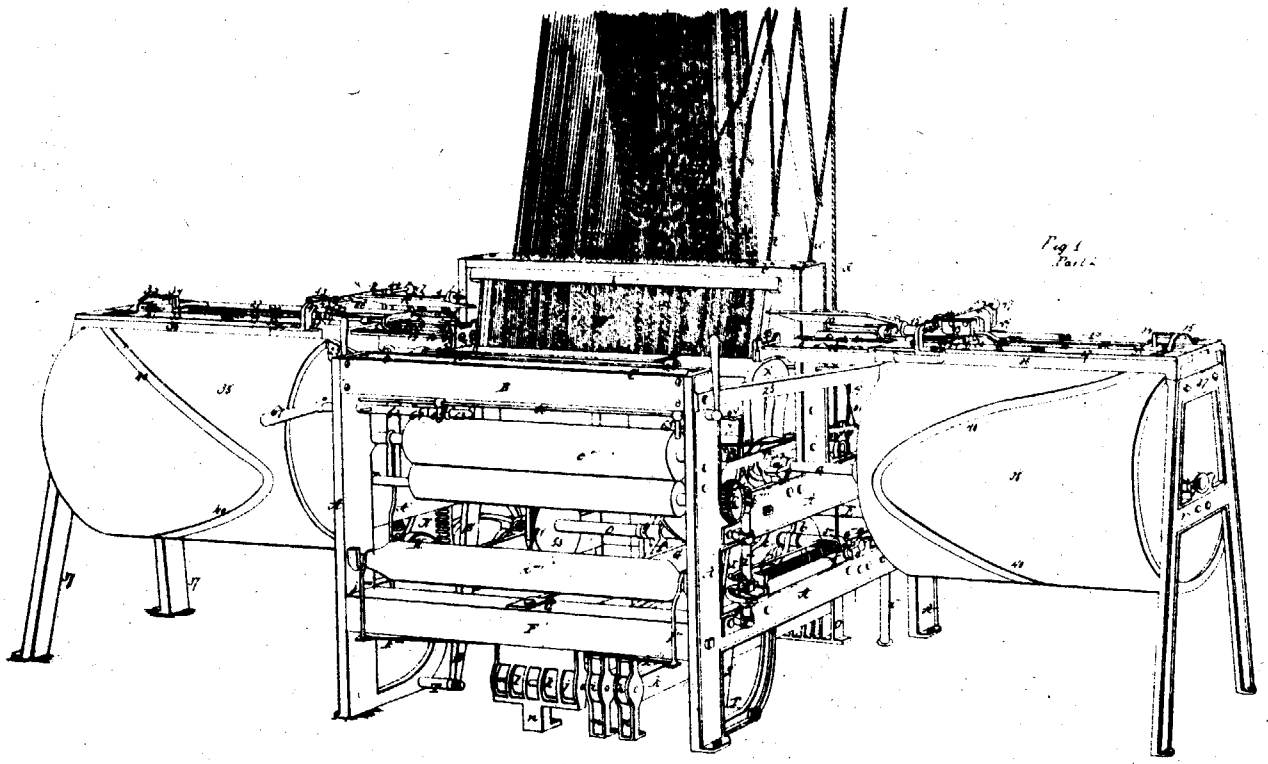

E. B. Bigelow.
Sheet 4.
4 Sheets.
Carpet Loom.
No. 143.
Reissued Sept. 11, 1849.
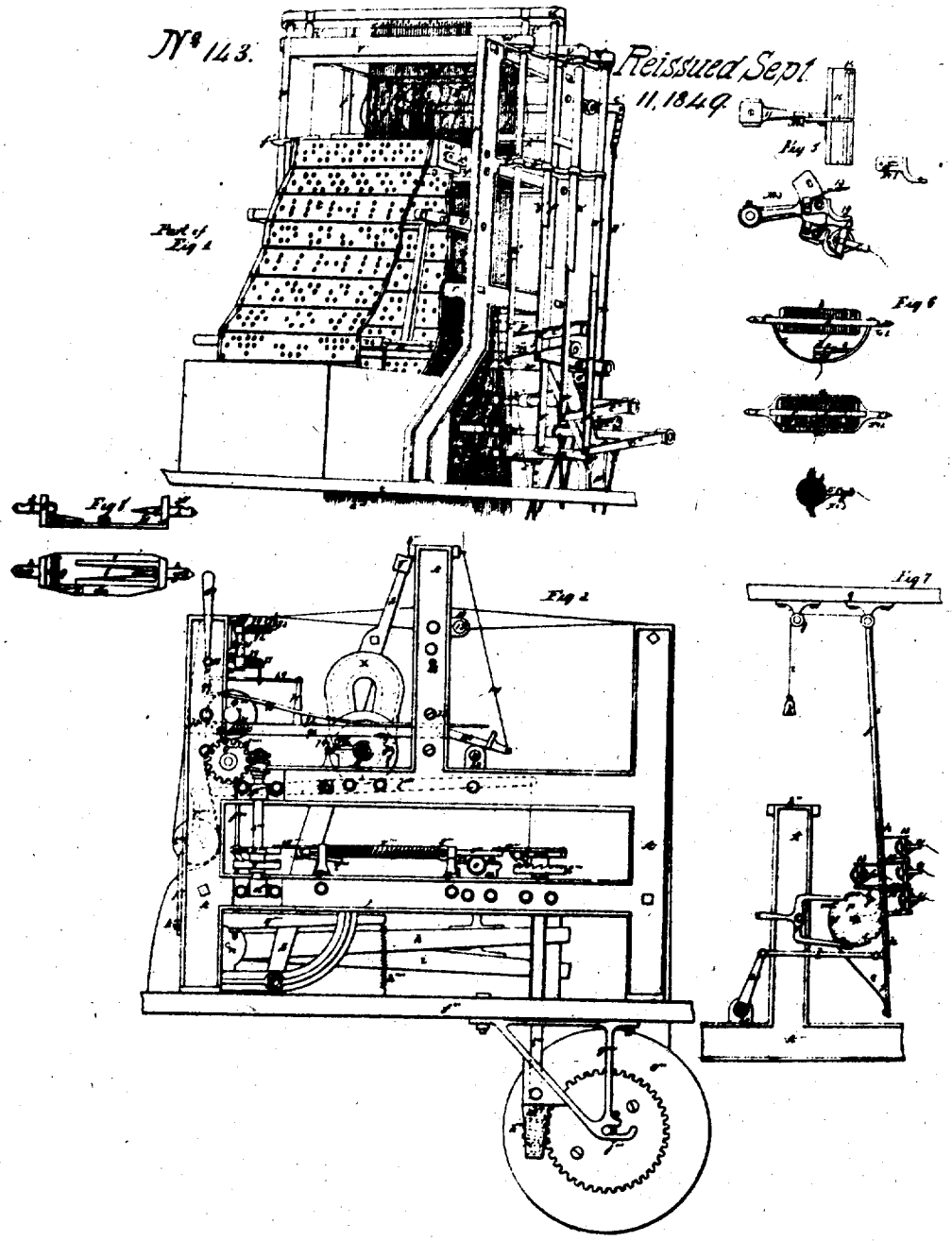

UNITED STATES PATENT OFFICE.

ERASTUS B. BIGELOW, OF CLINTONVILLE, MASSACHUSETTS.

IMPROVEMENT IN LOOMS FOR WEAVING CARPETS AND OTHER FIGURED FABRICS.

Specification forming part of Reissued Letters Patent No. 143, dated September 11, 1849. Original No. 2,625, dated May 16, 1842. Application for reissue filed July 27, 1849.

*To all whom it may concern:*

Be it known that I, ERASTUS B. BIGELOW, of Clintonville, in the county of Worcester and State of Massachusetts, have invented new and useful Improvements in Looms for Weaving Two and Three Plied Kidderminster Carpets and other Fabrics; and I do hereby declare that the following is a full, clear, and exact description of the principle or character which distinguishes them from all other things before known and of the manner of making, constructing, and using the same, reference being had to the accompanying drawings, making part of this specification, in which—

Figure 1 is a perspective view of the entire loom with the jacquard arrangement; Fig. 2, an elevation of the right-hand end thereof, with the shuttle-boxes and the machinery for working the shuttles removed; Fig. 3, a like elevation of the left-hand end; Fig. 4, a plan of the loom below the jacquard and without the harness.

The parts which are represented in sectional figures will be referred to in their appropriate places.

The same letters indicate like parts in all the figures.

The first part of my invention relates to the operation of the jacquard by its connection with the power-loom; and it consists in depressing one trap-board, (or more,) while the other (or corresponding trap-board) is elevated, whereby the power required at each operation for elevating that portion of the harness and its appendages which carries up the warps is balanced in whole or in part by the remaining and descending portion, thus equalizing the power required to give the motions, and therefore admitting of more rapid working of the mechanism, for when the trap-boards are operated separately at the time of lifting a great strain comes upon the machinery of the loom, and hence the motions can neither be so easy or so quick, and another and important advantage is the saving of one-half of the time required for working the trap-boards, for when they are worked separately one must have completed its motion before the other begins to move, while by my improvement the two operations are performed simultaneously.

The second part of my invention, which relates to the location and operation of the journals, consists in placing and working the journals above the jacquard, whereby the knotted cords are kept straight and the proper action of the trap-boards on them secured.

The third part of my invention, which relates to the working of the cards for changing the figures, consists in working the card-prism while the trap-boards are at rest by a cam or the equivalent thereof connected with the loom or receiving motion therefrom.

The fourth part of my invention, which relates to the delivering or giving out of the warps, consists in regulating the delivery or giving out of the warps by the tension of the warps or chain acting on a vibrating roller (or the equivalent thereof) intervening between the take-up roller and the yarn-beam and combined with a regular and positive motion for taking up the cloth as it is woven to produce figures thereon which will match the irregularities of the weft or filling, being thereby taken up in the thickness instead of the length of the cloth.

The fifth part of my invention, which relates to the shuttle-boxes, consists in the employment of series of shuttle-boxes in separate frames independent of the lay and by the side thereof, whereby the weight of the shuttle-boxes and their appendages is removed from the lay, which adapts it the better to the quick movements required in power-loom weaving with economy.

The last part of my invention, which relates to the stopping of the loom when a change of colors is required, consists in combining the shipper of the loom (or the equivalent thereof) employed for stopping the loom with the jacquard, whereby the loom will be stopped by the operation of the jacquard whenever a change of colors is required.

*Description of the frame-work and main gearing of the loom.*

A A are the end frames of the loom.

B is the breast-beam, which has the roller C revolving in it, so as to allow the cloth to pass freely over it.

D is the top back girth; E the bottom back, and F the bottom front-girth.

G is the middle cross-girth.

H is the driving-pulley, which is made so as to revolve on the driving-shaft, and is engaged and disengaged therewith for the purpose of starting and stopping the loom by means of the clutch J, which is seen in Fig. 1.

The shaft I revolves in suitable boxes, one of which is seen at L, and has affixed to it the driving-pinion M, which meshes into and turns the cogged wheel N. The cogged wheel N is affixed to the cam-shaft O and takes into the cogged wheel P, which is keyed to the lathe-shaft Q. The relative sizes of the cogged wheels N and P are as four of the latter to one of the former—that is, the wheel P is to make four revolutions to one of the wheel N.

The driving-pinion M may be of any size which will give the requisite power to drive the loom.

The lathe-shaft Q revolves in the boxes R R and operates the lathe in the following manner, viz: S S are the swords of the lay, which vibrate in the T T. The race-beam U and the top shell V support the reed W. X X are double or hollow cams keyed to the lathe-shaft Q. The places of the grooves in these double or hollow cams X X are shown by the dotted lines in Fig. II. Within these grooves there are friction-rollers, which are fitted to them, said rollers revolving on studs which are firmly affixed to and project from the outer sides of the swords S S. The rollers and the studs above named are concealed in the drawings by the cams X X; but such fixtures are well known, and from the description here given it is evident that when the shaft Q revolves said cams will give the lathe the required motion. The cam-shaft O revolves in boxes (see Fig. 4) and has affixed thereto the cams or wipers *b*, *c*, *d*, *e*, *f*, and *g*.

In the operation of the loom the cams or wipers *b*, *c*, *d*, *e*, *f*, and *g* act on their respective treadles *h*, *i*, *j*, *k*, *l*, and *m*, which treadles are hung at one end in the treadle-hangers *n n* and guided in their vertical motion at the reverse ends by the treadle-guides O O. The particular office of said cams and treadles will be described in connection with the parts of the loom which they actuate.

The first improvement to be noticed is the peculiar construction and arrangement of the jacquard machine, whereby one trap-board is made to descend while the other rises, and the weight of the harness on the descending trap-board is made to counteract or balance the weight of the harness on the ascending trap-board, thereby equalizing the power required to drive the loom.

This machine is described and represented in the drawings as arranged for two-ply carpets.

In Figs. I and III, *p p* is the end frame of the machine, shown as standing on the upper floor of the mill.

*r r* are the cross-girths.

*s* is the card-box to contain the pattern-card *t*.

*u u* are guides to conduct the pattern-card *t* properly into the box *s*, said guides being supported by the stands *v v*, which are bolted to the frames *p p*. The card-prism or polygon *w* for carrying the pattern-card *t* is constructed in the ordinary way and made to revolve in the sliding bars *x x*, which have a horizontal reciprocating motion through suitable guide-stands *y y*, bolted to the frame *p p*.

*z z* are vibrating levers affixed to the fulcrum-shaft *a'*, and are connected to the sliding bars *x x* by means of rollers working in slots in their lower ends. The shaft *a'* turns on the stands *b' b'* and has the lever *c'* extending from it at right angles with the levers *z z*. The arm or lever *c'* is connected to the treadle *i* by means of the cord or rod *d'* and is actuated by the cam *c*. The cam *c* acts on the treadle *i* and depresses the lever *c'* and carries out the card-prism or polygon *w*, and when the cam *c* relieves its action on the treadle *i* the card-prism *w* is brought back again against the needle-board by the action of a spiral spring encircling and acting upon the shaft *a'*.

*f'* is the snack or latch to turn the card-prism *w* when it is carried out by the levers *z z*. The hammer, which secures the prism *w* in its proper position, is concealed in the drawings behind the bar *x*, but its construction and action on the prism *w* are the same as in other Jacquard machines. The needles are also arranged and worked in the same manner as in the machines in common use for hand weaving. The trap-boards *g'* and *h'* are perforated with holes in the usual way, and are supported by the guide-rods *i' i'* and *j' j'*, said rods being guided by the guide-stands *k' k'*, bolted to the frame *p p*. The guide-rods *i'* and *j'* are connected with the vibrating levers *l' m'* by the bars *n' o'*, said bars being connected to said guide-rods and levers at their respective ends by means of a joint-pin. The vibrating levers *l' l'* and *m' m'* are fastened to their respective fulcrum-shafts *p'* and *q'*, which turn in suitable bearings in the frame *p p* and have the levers *r'* and *s'* extending from them opposite to the levers *l' l'* and *m' m'*. The journals *t' u' v' w'* are placed at the top of the Jacquard machine and fastened to their respective rods *x' y' z' a''*, said guide-rods being guided by the guide-stands *k' k'*. The guide-rods *x' y' z' a''* are connected to the respective vibrating levers *b''*, *c''*, *d''*, and *e''* by means of the connecting-bars *f''*, *g''*, *h''*, and *i''*, said bars being jointed to said levers and guide-rods at their respective ends in such a manner as to move up and down freely. The vibrating levers *b''*, *c''*, *d''*, and *e''* are affixed to their respective fulcrum-shafts *j'' k'' l'' m''*, which turn in suitable bearings in the frame *p p* and have extending from their sides opposite the vibrating levers *b''*, *c''*, *d''*, and *e''* the arms or levers *n''*, *o''*, *p''*, and *q''*. The arms or levers *n''*, *o''*, *p''*, and *q''* are connected to their respective treadles *j k l m* by means of the cords or rods *r''*, *s''*, *t''*, and *u''*. The rods or cords *r''* and *s''* are connected with the arm or lever *r'* by the cords *v''* and *w''*, and the rods or cords *t''* and *u''* are connected with the arm or lever *s'* by the cords *x''* and *y''*. The cams *d*, *e*, *f*, and *g* work their respective journals $t'$ $u'$ $v'$ $w'$ and the trap-boards $g'$ and $h'$ in the following order: Suppose the journal $v'$ and the trap-board $h'$ to be raised, as seen in the drawings. Then the journal $t'$ and the trap-board $g'$ rise simultaneously with the descent of the journal $v'$ and trap-board $h'$. Then at the same time that the journal $t'$ and the trap-board $g'$ descend the journal $w'$ and trap-board $h'$ rise. When the journal $w'$ and trap-board $h'$ descend the journal $u'$ and trap-board $g'$ rise, and as the journal $u'$ and trap-board $g'$ descend the journal $v'$ and trap-board $h'$ ascend to repeat the operation, as before.

The card-prism or polygon $w$ is operated by the cam $c$ while the trap-board $g'$ and $h'$ are at rest, either one or the other of said trap-boards being in a raised position. By working the card-prism $w$ in this way one of the trap-boards may descend while the other rises without disturbing the perfect action of the machine. The knot-cords $z''$ $z''$ are suspended from the journals $t'$, $u'$, $v'$, and $w'$ and pass down through the trap-boards $g'$ $h'$ and the needle-eyes and connect with the neck of the harness $a'''$ $a'''$ in the ordinary way. The neck of the harness $a'''$ $a'''$ passes down from the knot-cords $z''$ $z''$ through the stationary harness-board $b'''$ to the mails, from which weights are suspended in the usual manner. The knot-cords and the harness aforesaid are represented in the drawings by the red lines; but the mails and the weights are connected behind the reed W and the breast-beam B, and these being the same as those in common use it is not necessary to represent or describe them.

The second improvement to be described is the peculiar construction and arrangement of the machinery employed to deliver out the chain or warp and take up the finished cloth, which machinery operates in such a manner as to give a uniform tension to the chain or warp during the process of weaving and insure the accurate matching of the pattern or figure.

In Fig. 2, $e'''$ is the yarn-beam, which, for the convenience of having it of large size, is placed under the floor $f'''$ in the story of the mill next below the loom and is supported by the hangers $g'''$. The endless screw or worm $h'''$ is affixed to the vertical shaft $i'''$ and takes into the cogged wheel $j'''$ on the yarn-beam $e'''$. The vertical shaft $i'''$ is supported by the stands $k'''$ and has affixed to its upper end the contrate ratchet-wheel $l'''$. Above the contrate ratchet-wheel $l'''$ is the vibrating lever $m'''$, which turns on the vertical shaft $i'''$ as its fulcrum. To one end of the vibrating lever $m'''$ the click $n'''$ is attached, which actuates the contrate ratchet-wheel $l'''$, and the other end is connected to the sliding bar $o'''$ by the bar or rod $p'''$. The sliding-bar $o'''$ slides in the standards $q'''$ $q'''$ and is encircled by the spiral spring $r'''$, one end of which rests against the standard $q'''$ and the other end against the stud or arm $s'''$. To the end of the arm $s'''$, projecting toward the loom, one end of the rod $t'''$ is attached, the other end of said rod being bent in a hooked form and working in a groove in the stud $u'''$, projecting from the sword of the lathe $s$. When the lathe approaches the breast-beam to beat up the cloth, the rod $t'''$ draws the sliding bar $o'''$ forward, and when the lathe returns the spiral spring $r'''$ forces said sliding bar $o'''$ back until the arm $s'''$ strikes against the stand $q'''$, which determines the degree of motion of the sliding bar $o'''$. The sliding bar $o'''$ is connected to one end of the vibrating lever $v'''$ by the rod or bar $w'''$. To the other end of the vibrating lever $v'''$ the click $x'''$ is attached, which actuates the contrate ratchet-wheel $y'''$. The contrate ratchet-wheel $y'''$ is affixed to the vertical shaft $z'''$, which turns in the stands $a''''$ $a''''$. The worm or endless screw $b''''$, affixed to the upper end of the vertical shaft $z'''$, takes into the cogged wheel $c''''$ on the shaft of the roller $d''''$. The roller $d''''$ turns in bearings in the frame A A and is covered with emery or otherwise rendered rough to increase the friction on its surface. The roller $e''''$, resting upon the roller $d''''$, is covered with cloth and guided by bearings in the frame A A. The roller $e''''$ is weighted down upon the roller $d''''$, to prevent the cloth from slipping between them, by means of the hooks $f''''$ $f''''$, the levers $g''''$ $g''''$, and springs or weights $h''''$ $h''''$. The vibrating or tension roller $i''''$ may be of any convenient diameter and vibrates up and down in grooves in the frame A A.

$j''''$ $j''''$ are hooks hanging in grooves on either end of the tension-roller $i''''$ and conical with the spring $k''''$, which is adjusted by means of nuts on the lower ends of the hooks $j''''$ $j''''$ and gives a proper tension to the warp or chain.

$l''''$ is the regulating-lever (shown by the dotted lines in Fig. II) to regulate the quantity of yarn delivered out from the yarn-beam $e'''$ and vibrates on the fulcrum-stud $m''''$. The regulating-lever $l''''$ is connected at one end to the tension-roller $i''''$ by means of the bar $n''''$ and at the other end to the click $n'''$ by means of the cord $o''''$, so that when the tension-roller $i''''$ is depressed it raises the click $n'''$ from the ratchet-wheel $l'''$ and cuts off its action thereon, and when said roller is raised said click falls down and removes its action on the ratchet-wheel $l'''$. The yarn passes from the yarn-beam $e'''$ up through the floor $f'''$, over the girth D, through the mails, and through the reed W, over the roller C in the breast-beam B, thence down around the tension-roller $i''''$, up over the roller $e''''$, thence between the roller $e''''$ and the roller $d''''$, and down through the floor $f'''$, as shown by the red line in Fig. II. The diameter of the roller $d''''$ and the number of teeth in the cogged wheel $c''''$ and in the contrate ratchet-wheel $y'''$ are so proportioned that the periphery of the roller $d''''$ shall pass over as much space every thread of filling that is introduced as that thread of filling will occupy in the cloth—that is to say, in case it is required to weave a fabric with forty picks to the inch, the periphery of the roller $d''''$ must move one-fortieth of an inch every thread of filling introduced. It is obvious that the relative velocity of the periphery of the roller $d''''$ may be varied either by varing the diameter of said roller or by varying the number of teeth in the cogged wheel $c''''$ or in the contrate ratchet-wheel $y'''$. The cogged wheel $j'''$ on the yarn-beam $e'''$ and the contrate ratchet-wheel $l'''$ should be so proportioned that the click $n'''$, provided that it is allowed to act on the rachet-wheel $l'''$ continually, will deliver out the required length of chain or warp when the yarn on the beam is at the smallest diameter or about exhausted.

The mode of operating the machinery for delivering out the chain or warp and of taking up the finished cloth is as follows: When the lathe approaches the breast-beam to beat up the cloth, it moves the sliding bar $o'''$, which, by means of the parts connected therewith, turns the ratchet-wheel $y'''$ the space of one tooth and the ratchet-wheel $l'''$ the space of one or more teeth, according as the click $n'''$ is acted on by the roller $i''''$. Now suppose the roller $i'''$ to be sunk to such a degree as to raise the click $n'''$ from its action on the ratchet-wheel $l'''$, thereby leaving the yarn-beam $e'''$ at rest, it is evident that as the rollers $d''''$ and $e''''$ take up a given length of finished cloth every thread of woof or filling introduced it will raise the roller $i''''$ and allow the click $n'''$ to renew its action on the roller $i''''$ and allow the click $n'''$ to renew its action on the ratchet-wheel $l'''$ and deliver out a new portion of the chain or warp. In case too much chain or warp is being given out, or, in other words, when more is given out than is taken up by the rollers $d''''$ and $e''''$, the roller $i''''$ descends, raises the click $n'''$, and again cuts off its action on the ratchet-wheel $l'''$.

The third improvement to be described is the mode of constructing the shuttle and shuttle-boxes and of connecting said boxes to the main frame of the machine instead of attaching them to the lathe, as heretofore done. The shuttles 1 1 are made of a plate of iron or other metal with a projection rising at each end, a top view of which is seen in Fig. IV and a side view in Fig. I. An enlarged view of this part is also shown in Fig. VIII. The round pins 2 2, extending from the projections on the shuttle 1, are pointed at the ends and have a notch filed in the top side. 3 3 are guide-pins, the office of which will be described in connection with the parts which operate the shuttles. 4 is the pin or skewer for holding the quill or bobbin, which may be made like those in common use. 5 is a spring to secure the quill to the pin or skewer 4. The filling passes from the quill through the eye 6, under the bar or lever 7, and out through the eye 8. The spiral spring 9 encircles the fulcrum of the lever 7 and acts thereon in such a manner as to give a degree of friction to the filling in proportion to the tension required. The shuttle-boxes 10 10 are formed of a table or plate of iron with a piece turned up at right angles on one edge, by which they are secured to the arms 11 11. An end view of the shuttle-boxes 10 10 is seen in Fig. III, a front view in Fig. I, and a plan in Fig. IV. 12 12 are bars or guides to guide the shuttle 1 1. The bars 12 12 are made beveling on the edge against which the shuttle 1 bears to prevent the shuttle from rising up. 13 13 are springs or binders to secure the shuttles in the boxes. 14 14 are pins projecting from the plate or table of the shuttle-boxes to arrest the shuttle when it enters the box. The arms or levers 11 11 are affixed to their fulcrum-shafts 15 15, which turn in the standards 16 16. The adjusting-screws 17 17, to regulate the downward motion of the shuttle-boxes 10 10, rest on the standard 25, when said boxes are depressed to bring the shuttle in the top box into operation. The standard 25 is bolted to the frame A A. The arms or levers 18 18 extend from the fulcrum-shafts 15 15 and are connected by the chains or rods 19 19 to the arms or levers 20 20, which are affixed to the shaft 21. The shaft 21 turns in the standards 22 22 and has the arm or lever 23 extending from it, which is connected to the treadle $h$ by means of the cord or chain 24.

The operation of the shuttle-boxes is as follows: Suppose said boxes to be depressed to a position to work the shuttle in the top box. Then when it is required to work the shuttle in the lower box the cam $b$ acts on the treadle $h$, and through the medium of the cords or chains 24 and 19 and arms or levers 20, 18, and 11 raise the boxes to the position shown in the drawings. Now when it is required to work the shuttle in the top box the cam $b$ relieves its action on the treadle $h$ and allows the boxes to descend by their own gravity. Only two boxes are described, but any number may be used which it is practicable to work. One method of using a series of boxes will be noticed under the head of "Modifications."

The fourth operation to be described is in the manner of passing or handing the shuttle through the warp by means of reciprocating arms instead of throwing it by a sudden impulse of the machinery, as heretofore done, said arms working the shuttle in such a manner as to give the filling or woof an equal and uniform tension and insure a smooth face and straight and even selvage to the cloth. The reciprocating arms 26 26 for handing the shuttle through the warp are usually made cylindrical at the inner ends, or those presented to the shuttle-boxes, and a hole is drilled in the axis of this cylindrical part to receive the round terminations or pins 2 2 on the ends of the shuttles. Grooves are made in the top side of the holes in the ends of said arms to receive the feathers or steady-pins 3 3, which, entering said grooves, prevent the shuttles from turning round in the holes within which they are received. The arms 26 26 are grooved on either edge and slide on the guideways 27 27. 28 28 are latching-levers for holding the round pins 2 2 on the shuttle in the ends of the arms 26 26. These levers vibrate on a fulcrum-pin 29. (See Fig. I.) The arms of said latching-levers which extend toward the cylindrical ends of the reciprocating arms are let into said arms and have on them a catch or hook, which is received within the notch filed in the top side of the pins 2 2 for that purpose. To the under side of the reverse arms of the latching-levers 28 28 the springs 54 are affixed, which cause said lever to lock into the pins 2 2 when they enter the holes.

30 and 31 are rollers revolving on studs projecting from the latching-levers 28 28. The bar 32 slides in the bearing 33, and is so shaped at the end next to the loom that when drawn back it acts on the rollers 30 31 and releases the latching-levers 28 28 from the pins 2 2, and when said bar is moved forward it relieves its action on the roller 30 and allows the spring 54 to raise the latching-levers 28 28 to a position to lock onto the pins 2 2 again.

34 is a projection rising from the bar 32, which strikes against the standard 35 when the arm 26 is drawn back and meets said bar while the arm 26 continues to move back.

55 55 are guides to support the arms 26 26.

36 36 are standards to support the ways 27 27, with one end resting on the standard 37 37 and the other on the standard 25.

38 38 are two grooved cylinders or drums, the outer ends of the axles of which turn in the boxes 39 39, and the reverse ends of which are coupled to the lathe-shaft Q.

40 40 are grooves in said cylinder, to which friction-rollers are fitted, said rollers turning on studs 41 41, which extend downward from the arms 26 26, when the cylinders or drums 38 38 are caused to revolve. The action of the grooves 40 40 upon the arms 26 26 will be such as will cause them to vibrate back and forth through the ways in the manner required. The cylinders which I have used are about thirty-two inches in diameter and about the same in length. They give a motion to the arms of twenty-nine and a half inches. 42 42 are stands bolted to the standards 36 36.

43 43 are cams which act on the rollers 31 31 and operate the latching-levers 28 28.

44 44 are shafts turning in the bearings 45 45.

46 46 are arms extending from the shafts 44 44 and made hooked at their outer ends, and there hook onto the projection 34 and arrest the bar 32. The arms 47 47 project downward from the shafts 44 44 and are connected to the rod 48 by the rods 49 49.

50 is a stud projecting from the rod 48 and playing in a slot in the upper end of the lever 51. The lever 51 vibrates on the fulcrum 52 (see Fig. III) and has a stud projecting from its lower arm playing into the groove in the periphery of the cam 53. The groove in the cam 53 is so shaped as to give a vibrating motion to the lever 51 and slide the rod 48, which, through the medium of the rods 49 49 and the arms 47 47, turns the shafts 44 44 and raises one of the arms 46 and at the same time depresses the other.

In Figs. VI and VIII a shuttle and the apparatus concerned in handing it from one of the reciprocating arms to the other are shown on a larger scale; but the respective parts are designated by the same numbers as in Fig. 1. Their construction is thereby clearly shown.

The mode of carrying the shuttles through the warp is as follows: Suppose the loom to be in that stage of its operation in which it is represented in the drawings—that is to say, the arms 26 26 drawn back from the shuttle and the bar 32 moved forward, so as to relieve its action on the roller 30, thereby having the latching-levers 28 28 free to lock onto the shuttle-pins 22, the respective parts being in this position, then when the shuttle is to be handed across the loom, the cylinders 38 38 being made to revolve, as above stated, will, by means of grooves 40 acting upon the friction-rollers upon the studs 41, carry the arms 26 26 forward toward the middle of the loom; and the arm 26 on that side of the loom where the shuttle lies which is to be operated receives the pin 2 on the shuttle and carries said shuttle forward until it meets the other arm 26, which also receives the pin 2 on the reverse end of said shuttle. Now in case neither of the latching-levers 28 28 were released from its action on the pins 22, the arms 26 26 would be held fast by being locked to their respective shuttle-pins; but to prevent this and to determine the direction of the shuttle after the arms 26 26 meet the arm 46 on that side of the loom from which the shuttle was taken is depressed by the action of the cam 53, so that the projection 34 strikes against the hook thereon and draws back the bar 32 and releases its latching-lever 28. I have already said that when one of the arms 46 46 is depressed the other rises. Consequently the arm 46 on the reverse side of the loom from which the shuttle was taken would be raised and the projection 34 pass freely under it, and thereby leave the latching-lever locked on the shuttle-pin 2. The arms 26 26 now return, and when they arrive at the proper point to discharge the shuttle the rollers 31 31 strike against the cams 43 43 and release the latching-levers 28 28 and leave the shuttle in the shuttle-box, and at the same time the projection 34 on the bar 32, which was drawn back to release the latching-lever 28, when the arms 26 26 meet in the middle of the loom, strike the stand 35 and carries the bar 32 forward to leave the latching-lever 28 free to lock on the shuttle-pin 2 in the next operation.

The fifth operation to be described is the apparatus for preventing the selvage of the cloth from drawing in when the filling or woof is prevented by any cause from escaping freely from the shuttle, and also for stopping the loom when the filling or weft breaks or is exhausted on the bobbin.

56 is a vertical shaft turning in the standards 57 57 and has the forked arm 58 extending from it, which acts on the clutch J.

59 is a spiral spring encircling the shaft 56 and acting thereon in such a manner as to turn it in a direction to disengage the clutch from the clutch-holder 60, and thereby to stop the loom.

61 is an arm extending from the shaft 56, by which the operator throws the loom into gear.

62 is a rod jointed to the arm 61, and which slides in the frame A and the stand 63. When the operator moves the arm 61 toward the loom, the notch 64 filed in the side of the rod 62 locks onto the arm 65 and secures the loom in gear, and when the arm 65 is released from the notch 64 the spring 59 throws the loom out of gear. The arm 65 is affixed to the shaft 66, which turns in the end frames A A, and has the handles 67 67, projecting upward, by which the operator turns said shaft, and thereby releases the arm 65 to stop the loom.

68 is an arm extending downward from the shaft 66.

69 is a rod, one end of which slides laterally in a horizontal slot in the standard 70, (see Fig. II,) and the other end turns on the upright stud 71. The upright stud 71 projects from the sliding bar 72, which slides in the standards affixed to the frame A A, by which they are hidden in the drawings, but are of a character not to need description. From the under side of the bar 72 the arm 74 projects, which is acted on by the cam 75 and carries forward the bar 72 and rod 69, and when said cam relieves its action on the arm 74 the bar 72 is forced back again by the spiral spring 76. The cam 75 is screwed to the nut $x$, and may be adjusted by the slot 77, and should be so placed as to act on the arm 74 at the time it is desired to throw the loom out of gear when the filling breaks or is exhausted. When the shuttle is properly armed with filling, the rod 69 is kept to the left-hand side of the arm 68, so as to pass freely by it when forced forward by the cam 75 and no action is produced; but when the filling is broken or is exhausted the vibrating end of the rod 69 is made to present to the side of the arm 68, so that when said rod is moved forward by the cam 75 it turns the shaft 66 and throws the loom out of gear.

The apparatus for regulating the action of the rod 69 on the arm 68 and for preventing the selvage of the cloth from drawing in when the filling is obstructed in its delivery from the shuttle is constructed as follows:

78 is a horizontal shaft turning in the stands 79 79.

80 80 are vertical shafts, the upper ends of which turn in the shaft 78 and the lower ends thereof in the stands 81 81, screwed to the under side of the shaft 78. From the vertical shafts 80 80 the arms 82 82 extend, which have two projections rising from their upper sides, through which one leg of each of the wire hooks 83 83 slides.

84 84 are spiral springs to throw the hooks 83 83 forward.

85 85 are collars screwed to the hooks 83 83 and made flat on their under sides to rest on the top sides of the arms 82 82 to keep the hooks 83 83 from turning round. The collars 85 85 limit the motion given to the hooks 83 83 by the spiral springs 84 84.

86 86 are arms, one of which extends from the front side of one of the vertical shafts 80 and the other from the back side of the other shaft 80, and are connected together by the rod 87 in such a manner as that when one of the shafts 80 80 turns in one direction the other turns in the opposite direction.

88 is an extension of the rod 87, and has a downward projection at the end, in which a vertical slot is made to receive the rod 69. This slot allows the shaft 78 to vibrate without moving the rod 69. The spiral spring 89 acts on the rod 87 and throws the arms 82 82 out of the position seen in Fig. (IV.)

90 is an arm extending from one of the vertical shafts 80 80, and which limits the approach of the arms 82 82 toward the cloth by striking against the stand 81. The arm 91, extending from the shaft 78, has the roller 92 revolving on a stud at its lower end, which is acted on by the cam 93 and vibrates the shaft 78.

This apparatus operates as follows: When the loom is in that stage of its operation in which the lathe is falling backward, the warps opening, and the shuttle about to start, the cam 93, through the medium of the roller 92 and arm 91, turns the shaft 78, thereby raising up the points of the wire hooks 83 83 forward of the filling, so that when the shuttle passes the thread of filling which said shuttle carries draws round the point of the wire hook, which is at that side of the loom from which the shuttle is taken, and draws said hook toward the selvage of the cloth until the arm 90 strikes against the stand 81, which prevents its further approach, and thereby prevents the filling from drawing the selvage of the cloth when it is obstructed in its delivery from the shuttle. When the filling is drawn round the hook 83, as aforesaid, the spiral spring 84 84 allows said hooks to adjust themselves to the face of the cloth. When the hooks 83 83 are drawn up to the selvage of the cloth, as aforesaid, they move the vibrating end of the rod 69 to the left side of the arm 68, and in case the filling is running properly from the shuttle retain said rod in this position. When it is moved forward by the cam 75, it passes by said arm 68 without producing any effect; but in case the filling is broken or is exhausted the hooks 83 83 recede from the selvage of the cloth by the action of the spring 89 and bring the rod 69 in a position to act on the arm 68 and throw the loom out of gear. When the loom has proceeded to that stage of its operation at which the shuttle is about to enter the shuttle-box, the cam 93 relieves its action on the arm 91, and the weight of said arm draws the hooks 83 83 out from the filling and allows it to close into the selvage, and also allows said hooks to free themselves from the lathe when it beats up the cloth.

Although there are but two pairs of shuttle-boxes described and represented in the foregoing specification, it is contemplated to use a series of boxes containing any number of shuttles which may be employed to the best advantage—one mode of constructing and operating which will be hereinafter set forth under the head of "Modifications." In making some descriptions of carpets, however, it may be expedient to use boxes carrying no more than two or three shuttles, in which case the shuttles containing the different colors of filling for shading the carpets are to be shifted by the operator, and this may be done either when the loom is in operation or by having the loom stop of itself when such changes are to be made.

The apparatus for stopping the loom when the shuttles are to be changed is described as follows:

94 is a cam screwed to the cam $x$ in the same manner as the cam 75, and this acts on the arm 95, which projects downward from the sliding bar 96 and moves said bar forward. The sliding bar 96 slides in the stands 73 73, and when the cam 94 relieves its action on the arm 95 the spiral spring 97 forces the bar 96 back again.

98 is a rod, one end of which slides in the stand 73, and the other is jointed to the arm 99, projecting downward from the shaft 66.

100 is a hook jointed to the bar 96 and connected to the Jacquard machine by the cord 101.

This apparatus operates as follows: When the loom is to be stopped to change a shuttle, the Jacquard machine, by acting on the cord 101, raises the hook 100 to a level with the rod 98. Then at the proper time the cam 94 forces the bar 96 forward, which by the action of the hook 100 on the rod 98 throws the loom out of gear. The cord 101 is to be connected with one of the knot-cords operated upon by the trap-boards and governed by a needle and cords in manner similar to the other knot-cords. The periods for the change of colors in the filling, which require the loom to be stopped for changing the shuttle, are determined by the cord.

I will now proceed to point out certain modifications which may be made in the within-described loom without in any manner departing from the principles upon which its action is dependent.

First. In the foregoing description and in the drawings therein referred to one mode of arranging the Jacquard machine and of mounting the loom for weaving two-plied carpets is represented and described. There are various other modes of arranging the Jacquard machine and of mounting the loom which are well understood by weavers and which may be varied according to the kind or style of goods to be produced. These various modes of arranging the Jacquard machine and of mounting the loom may be applied—and I intend to apply them— in connection with my improvements, varying them according to the style of goods to be woven.

Second. The vibrating or tension roller $i''''$ is represented in the drawings and is described as being applied to the cloth on the front side of the loom; but it may also be applied to the chain or warp on the back side of the loom and in the same manner and still act on the machinery employed to deliver out the chain or warp in a manner similar to that described and accomplish the same end without varying the principle on which it operates or changing its combination with the rollers $d''''$ $e''''$.

Third. The following is a modification of the mode of constructing the shuttle, which modification is represented by Nos. 1, 2, and 3, Fig. VI: No. 1 is a plan of the shuttle; No. 2, a front view thereof, and No. 3 a cross-section of it, giving an end view of the bobbin and showing the mode of delivering the yarn from the shuttle. The same letters of reference are used in the modifications that are used in the preceding parts of this specification to designate parts performing the same office. 22 are the round pins which enter the arms 26 26, as in the mode of constructing the shuttle before described, and form a part of the shuttle-frame $a$ $a$. (See Nos. 1, 2, and 3, Fig. VI.) The bottom side of the shuttle-frame $a$ is formed in the shape of a V, as shown in No. 3, Fig. 6. $b$ is the bobbin containing the weft or filling, and which turns on a skewer affixed to the shuttle-frame $a$ $a$ in the ordinary way. $c$ is a bow screwed to the frame of the shuttle $a$ $a$ to guide the woof or filling and support the apparatus, which gives tension to the same. $d$ is a bar projecting inward from the bow $c$ and turned up at the end as seen in No. 3, Fig. VI. $e$ is a shaft, one end of which turns in the bar $d$ and the other in the bow $c$. 7 is an arm projecting from the shaft $e$ and bent in such a manner as to rest on the bar $d$. 9 is a spiral spring encircling the shaft $e$ and adjusted thereto in such a manner as to cause the arm 7 to press on the bar $d$ and give friction to the filling in proportion to the tension required.

Fourth. The following is a description of a mode of constructing the shuttle-boxes as adapted to receive the modified shuttle above described, which mode is represented in Nos. 1, 2, 3, Fig. V. No. 1 is an end view of the table or piece of casting 10, which constitutes the bottom of the shuttle-box. No. 2 is a plan of the table or piece of casting 10 bolted to the arm 11, which supports the boxes, and No. 3 is an end view of the arm 11 with two shuttle-boxes bolted thereto, one of which contains the shuttle. The table or piece of cast-10 has a V-shaped groove to receive the under side of the shuttle-frame *a*. 14 is the arresting-pin to arrest the shuttle, and 13 is the shuttle-binder, which guides the top of the shuttle-frame *a* and secures the shuttle in the box. The shuttle-binder 13 has a notch in its under side, as shown in No. 2, Fig. V, which guides the top of the shuttle-frame *a a*. The shuttle-binder 13 is bolted to the table or piece of casting 10. The shuttle-boxes thus formed are bolted to the arm 11, as shown in Nos. 2 and 3, Fig. V. The arm 11 is to be attached to a shaft and operated in the same manner as the arm supporting the shuttle-boxes described in the preceding part of the foregoing specification.

Fifth. The following is a mode of arranging and operating a series of shuttle-boxes in separate frames, and is represented in Fig. VII: A vertical frame is suspended from the upper floor of the mill at each side of the loom, to the back side of which frame a shuttle-box is attached, and on the front side of said frame another frame is so arranged as to slide up and down freely. To this last-named frame a series of boxes are attached. The frame carrying this series of boxes is moved up and down by means of a toothed rack and cogged wheel for the purpose of bringing the different shuttles into operation which contain the filling to form the figure, said cogged wheel being made to operate at proper intervals by the action of the Jacquard machine. The shuttle containing the ground-filling is placed in the box on the back side of the suspended frame, and the shuttles carrying the various colored filling for the figure are placed in the series of boxes on the sliding frame. The shuttle carrying the ground-filling and one of the shuttles carrying the figure-filling are brought into operation alternately by a swinging motion given to the suspended frame. A A, Fig. VII, is a part of the said frame of the loom. *q* is the upper floor of the mill. *f* is the frame suspended from the floor *q'*, with a shuttle-box affixed to the back side thereof at *g*. *h* is the sliding frame, to which is attached a series of boxes varying in number according to convenience. In the present drawings only three are represented. The red line *i* represents a strap or cord passing over a pulley on the axis of the frame *f* and over the pulley *j* to the weight *k*, which is suspended therefrom. The weight *k* is employed to counteract the weight of the sliding frame *h*. A swinging or vibratory motion is given to the frame *f* by means of the bar *l*, the arm 20, and the shaft 21, said shaft 21 being turned by the action of a cam and treadle in the same manner in which it is turned to operate the shuttle-boxes, as set forth in the preceding part of this specification. This vibrating or swinging motion brings the shuttle carrying the ground-filling and one of the shuttles carrying the filling to form the figure alternately into operation.

The mode of raising and depressing the frame *h* to bring the various shuttles into operation containing the different colored filling required to form the figures is as follows: *m* is a cogged wheel (shown in the drawings by dotted lines) affixed to the shaft *n*, and this wheel takes into the toothed rack on the frame *h*. The shaft *n* turns in the stands *o o* and has the wheel *p* affixed thereto. *q* is a spring, one end of which is affixed to the frame *f*. The other end is formed with a projection which takes into notches made to receive it in the periphery of the wheel *p*. From the outer side of the wheel *p* the pins *s s* extend. *r* is a latch to act on the pins *s s* in order to turn the wheel *p*. The latch *r* is connected with one of the knot-cords of the Jacquard frame, which at proper intervals causes it to act on the pins *s s*, and the upper or under arm is made to act on its respective pin, according as the frame *h* is to be raised or depressed. From this description it will be evident that when the upper arm of the latch *r* is depressed, as seen in Fig. VII, and the frame *f* moved backward, said arm will then act on the pin *s* and turn the wheel *p* the space of one pin, will depress the frame *h* and bring a new shuttle into operation. When the frame *h* is to be raised, the lower arm of the latch *r* is made to act on the pin *s*, which will give a reversed motion to the wheel *p*. This mode of arranging and working a series of shuttle-boxes is applicable, and I intend to apply it to looms in which the fly-shuttle motion is used, the variation in the motion when so applied being obvious, and therefore not requiring to be described.

In the application of the principles herein pointed out as constituting my invention I do not wish to limit myself to the special constructions and arrangements herein pointed out, nor to the modifications set forth, as the invention is susceptible of many more modifications; but I have given a full, clear, and exact description of that mode of construction which I have assayed and deem the best, and only such modifications as I originally contemplated as illustrative of the facility with which modifications may be made in the mere construction and operation and without departing from the principles which characterize my invention.

Having thus fully described the manner in which I construct and arrange the respective parts of my loom for weaving carpets and shown the manner in which the same operates, what I claim as new, and desire to secure by Letters Patent, is—

1. In connection with the power-loom, depressing one trap-board (or more) while the other (or corresponding trap board or boards) is elevated, substantially as described.

2. Placing and working the journals above the trap-boards, substantially in the manner and for the purpose specified.

3. Working the card-prism of the jacquard by a cam (or the equivalent thereof) connected with the loom or deriving motion therefrom and while the trap-boards are at rest, substantially as described.

4. Regulating the delivery or giving out of the warps by the tension of the warps or chain acting on a vibrating roller, (or the equivalent thereof,) in combination with a regular and positive take-up motion for taking up the woven cloth, substantially as described.

5. The employment of a series of shuttle-boxes and a receiving shuttle-box on each side of the loom and supported in a separate and independent frame by the side of the loom, substantially as described.

6. Stopping the loom when a change of colors is required by combining the shipper (or the equivalent thereof) with the Jacquard, substantially as described.

E. B. BIGELOW.

Witnesses:
CHS. M. KELLER,
M. GRANDIN.